United States Patent [19]
Ruth

[11] 3,712,281
[45] Jan. 23, 1973

[54] INTERNAL COMBUSTION ENGINE INCORPORATING MODIFICATION TO REDUCE POLLUTION IN EXHAUST THEREFROM

[75] Inventor: Arthur P. Ruth, Houston, Tex.
[73] Assignee: Dalton L. Smith, a part interest
[22] Filed: March 23, 1971
[21] Appl. No.: 127,257

[52] U.S. Cl. ..........123/119 A, 123/25 P, 123/119 B, 123/119 E
[51] Int. Cl. ....................F02m 25/06, F02b 47/10
[58] Field of Search...123/119 A, 119 B, 25 P, 119 E

[56] References Cited
UNITED STATES PATENTS

| | | | |
|---|---|---|---|
| 3,446,196 | 5/1969 | Daigh | 123/119 A |
| 3,491,736 | 1/1970 | Walker | 123/119 A |
| 3,552,364 | 1/1971 | Short | 123/25 P |
| 3,556,066 | 1/1971 | Muirhead et al. | 123/119 E |
| 3,672,341 | 6/1972 | Smith | 123/119 E |

*Primary Examiner*—Wendell E. Burns
*Attorney*—Donald Gunn

[57] ABSTRACT

An internal combustion engine which includes certain modifications to reduce the pollution thereof. The exhaust stream from the exhaust manifold of the engine is returned in part or in whole, subject to the control of a valve means, for recycling through the carberator. Dependent upon the loading of the engine, a variable supply of oxygen is interjected at the carberator to enhance the extent of combustion and thereby reduce the non-combusted hydrocarbon gases. Recirculation is further accompanied by the injection of steam at the carberator to slightly cool the gases drawn into the internal combustion engine, thereby increasing the compression and tending to improve the extent of combustion within the engine.

14 Claims, 4 Drawing Figures

PATENTED JAN 23 1973 3,712,281

Arthur P. Ruth
INVENTOR

BY

Donald Gunn

ATTORNEY

INTERNAL COMBUSTION ENGINE INCORPORATING MODIFICATION TO REDUCE POLLUTION IN EXHAUST THEREFROM

SUMMARY OF PROBLEM AND SOLUTION

Pollution of vehicular traffic is generally a result of inadequate or incomplete combustion of the hydrocarbon fluids burned in the engine. Engines customarily burn high octane gasolines, although engines are known which consume kerosene and compressed natural gas or liquid processed gases. In any case, the internal combustion engine has an exhaust stream issuing forth from the exhaust manifold, which stream contains partially or incompletely consumed hydrocarbon vapors. The pollution which is so prevalent in areas of heavy vehicular traffic is thus thought to be in large part comprised of partially combusted hydrocarbon materials. This includes carbon monoxide, which is formed on the incomplete combustion of the hydrocarbon products, and whole molecules of the hydrocarbon product itself not even partially combined with oxygen. In both cases, the pollutants create difficulties in the atmosphere and must be dissipated over a period of time in a manner not desirable to heavily populated areas.

With these problems in view, the purpose of the present invention is to provide a system whereby exhaust gases from an engine are captured and at least partially recirculated to cut down on the percentage of pollutants passed by the engine to atmosphere. Accordingly, the invention is summarized as incorporating an exhaust system for a typical internal combustion engine of ordinary construction which utilizes a bypass and return, to recycle a measurable portion of the exhaust. The lubricating oil is normally found in the rocker arm cover, and the crank case also gives off similar fumes. The main flow from the exhaust passes through a venturi mechanism to draw the vapors from the crank case and valve cover. The gases are then returned to the carberator and recycled into the engine. The carberator draws in outside air and also has an injector for elemental oxygen. The system is enhanced by a steam or water vapor injector which utilizes the heat of the exhaust manifold to vaporize the water, and the steam is injected at the carberator. This enhances combustion of the hydrocarbon products recycled by the device by causing the engine to burn cooler.

Many objects and advantages of the present invention will become more readily apparent from a consideration of the below included written and specification and drawings, which are:

Figure 1:
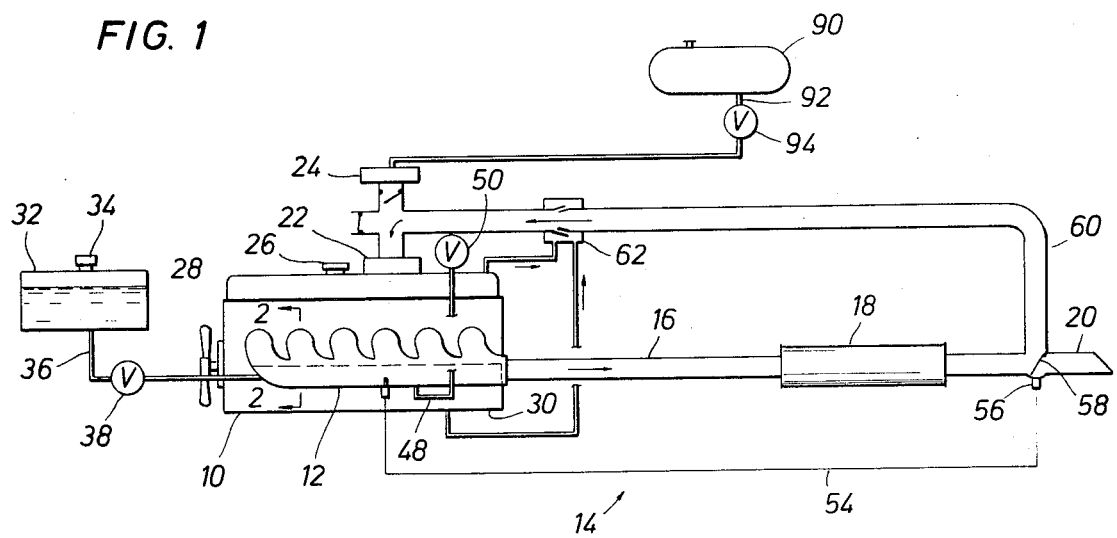
FIG. 1 is a schematic of the system of the present invention cooperative with a typical internal combustion engine wherein the various components are represented somewhat schematically.

In the drawings, attention is first directed to FIG. 1 where a conventional engine is illustrated and indicated by the numeral 10. The engine 10 is of conventional construction and is best described as an internal combustion engine. The engine 10 is shown with a six port exhaust manifold 12, but it will be appreciated that the present invention is likewise adaptable for other piston arrangements. For instance, the V-8 engine is quite commonly used in vehicles. In addition, four cylinder engines and engines with more than eight cylinders are likewise known. In any case, the present invention is adapted for use with all such internal combustion engines inasmuch as they are provided with one or several exhaust manifolds. As in the case of the V-8 engine, the exhaust manifolds are grouped and then gathered together to generally form a single exhaust, in which case the interconnection of the present invention may likewise again be accomplished in the manner herein taught. The present invention will be indicated generally by the numeral 14. Before the present invention is described, the engine will be set forth in substantial detail to identify the cooperative or supporting structure for the present invention.

The exhaust manifold 12 is connected with an exhaust pipe 16 which connects to a muffler 18. The muffler 18 connects to a tail pipe 20 by which the exhaust gases are emitted to atmosphere. Inasmuch as the exhaust pipe, muffler and tail pipe are quite similar to presently existing systems, except as to modifications of the present invention, it is believed that no further details are required for description thereof. In addition, FIG. 1 incorporates a carberator which is indicated generally at 22 in schematic form. The carberator has an air cleaner 24 which is of conventional construction also. As shown in FIG. 1, the carberator and air cleaner are not connected directly together, but apparatus relating to the present invention is interposed therebetween as will be set forth hereinafter. A significant fact noteworthy at this juncture is that the carberator and air cleaner are again of conventional construction.

The engine shown in FIG. 1 has an oil filler cap at 26. The oil filler cap 26 is again of conventional construction. Oil typically is emptied into the engine from a container, and is permitted to circulate through the upper portions of the engine which are normally covered by valve covers 28. The lower portions of the engine are indicated by the numeral 30. It is possible to gather substantial polluting vapors from both the valve cover 28 and the crank case 30.

Considering the modifications of the present invention, attention is first directed to a water container which is indicated by the numeral 32. The water container has a cap at 34 which covers a spigot whereby the container can be filled. Preferably, the water is maintained at some elevated pressure so as to force the water from the tank. A feed line 36 is connected to the tank 32. A valve 38, preferably a check valve which also provides a metered rate of flow in the line 36 is incorporated in the line. The line 36 is connected with the exhaust manifold 12 in a manner to be described hereinafter.

Figure 2:
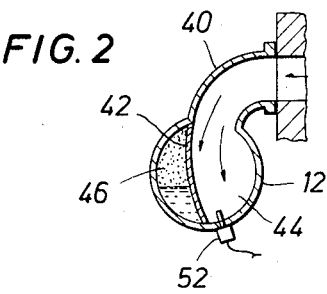
FIG. 2 is a sectional view taken along the line 2 — 2 of FIG. 1 illustrating a heat exchanger utilizing the heat of the exhaust gases to vaporize water for later injection into the engine.

Attention is next directed to FIG. 2 of the drawings where the exhaust manifold 12 is shown in sectional view. As shown in FIG. 2, a riser 40 communicates from a single exhaust valve and associated piston to draw gases into the exhaust manifold 12 proper. The exhaust manifold is provided with multiple walls, including an internal wall 42. Thus, a gas chamber is defined at 44 and a steam chamber is defined at 46. Water is introduced into the chamber 46 through the feed line 36. Moreover, heat is surrendered from the gas chamber 44. The gas chamber extends along the full length of the exhaust manifold 12 and is actually that portion which connects with the exhaust pipe 16. The feed line 36 introduces a controlled rate of flow of water into the chamber 46. The heat is transferred through the wall 42 to the water, and causes the water to vaporize. The vaporized water is drawn off through a feed line 48. The feed line 48 has a valve 50 in it, and is interconnected in a manner to be described hereinafter.

Figure 4:
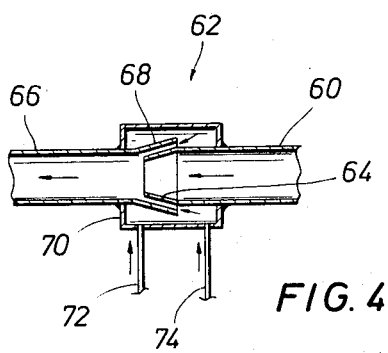

As shown in FIG. 2, a thermostat 52 is connected in the exhaust manifold. As the temperature rises in the exhaust manifold upon initially operating the vehicle, a signal is provided by the thermostat 52 on a conductor 54 shown in FIG. 1, which is communicated to a valve controller 56 which controls a valve 58 in the tail pipe 20. The valve 58 controls the extent of diversion of exhaust gases into a return conduit or pipe 60. The return pipe 60 extends from a point to the rear of the muffler to a venturi draw device 62. The device 62 is shown in greater detail in FIG. 4. The device 62 incorporates a nozzle 64 in the pipe 60. The nozzle 64 is pointed into an additional conduit 66. The conduit 66 is spaced from the nozzle 64 and has a flaired lip at 68. The flaired lip surrounds the nozzle 64. A chamber is formed by an encircling cylindrical structure at 70. The chamber is communicated through a gap or open space along the outside of the nozzle 64 into the conduit 66. The chamber 70 is connected by means of individual supply lines 72 and 74. The lines 72 and 74 communicate with the valve cover 28 and the crank case 30 shown in FIG. 1. The nozzle arrangement draws from within the chamber 70 and hence, creates a vacuum flow in the lines 72 and 74. This, therefore, draws the added pollutant gases from the points of the engine where the lines 72 and 74 are connected.

Figure 3:
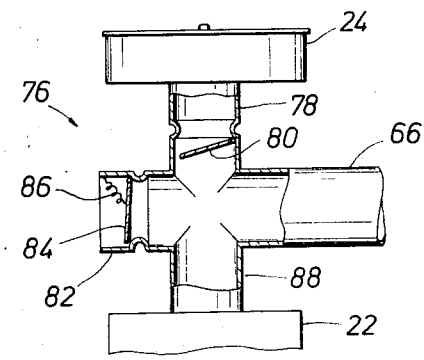
FIG. 3 is an enlarged detail view of the carberator to the extent that it is modified by the present invention; and, FIG. 4 is an enlarged view of a venturi mechanism utilizing the substantially large gas flow from the exhaust manifold to draw the relatively smaller volume of gases from the crank case and valve mechanism.

Attention is next directed to FIG. 3 of the drawings. In FIG. 3, the conventional carberator is indicated by the numeral 22, while the air cleaner is indicated at 24. The conduit 66 is connected into a four cornered mixer. The mixer is indicated generally by the numeral 76. The air cleaner is connected by the upper leg or pipe 78 and a flap valve 80 permits flow from the air cleaner downwardly but not upwardly. The conduit 66 is connected to the mixer 76 without a valve. The flow is sufficiently great in the conduit 66 into the mixer that no valve is particularly needed.

The numeral 82 indicates an exposed outlet from the mixer. The outlet 82 incorporates a valve 84 which is in the form of a flap which opens or hinges outwardly. A spring 86 resists its opening. In the event of undue pressure within the mixer 76 or a back-fire, or any other circumstance, the valve 84 will open to relieve the pressure within the mixer. However, it quickly closes to prevent the further escape of gases. The mixer 76 further includes a downward leg 88 which delivers the mix of air and gases to the carberator proper. The carberator is intended to function in its customary manner.

It will be noted that the pipe 66 is connected with the line 48 shown in FIG. 1. This injects a small amount of water vapor into the carberator. The addition or supplemental insertion of steam or water vapor enhances the running ability of the engine. Moreover, an oxygen tank is indicated in FIG. 1 at 90, and has a pilot line 92 communicating through a set or control valve 94 to the mixer 76. The tank 90 is a source of elemental oxygen. A small amount of oxygen can be controllably added to the mixer 76. It is immaterial whether the oxygen passes through the air cleaner, as illustrated in FIG. 1, or is inserted into the mixer direct. It has been omitted from FIG. 3 inasmuch as the mixer is a relatively large guage structure while the pilot line 92 is relatively small in diameter.

The mixer serves as a source to introduce pollutant gases back into the engine. It should be recalled that a running engine forms a fairly noticeable vacuum at the carberator intake. Thus, the vacuum is pulled in the mixing tee 76. This vacuum which is pulled tends to draw the exhaust gases from the pipe 66. Thus, the exhaust route begins with a fairly high pressure in the exhaust manifold where the gases are physically forced from the engine at a relatively high temperature and continues, urged by the high pressure source and drawn by the vacuum in the carberator. At this juncture, the gases have cooled several hundred degrees, perhaps from 500° or 600° F within the exhaust manifold but before entering the exhaust piping system to perhaps 200° or so with the advent of circulation over a reasonably lengthy route through the muffler, and so on. The drop in temperature tends to reduce the volume of gases. Accordingly, the gases, along with the injected steam, are drawn into the carberator.

In operation, the device of the present invention will be discussed in two operating conditions. The first occurs when the engine is just warming up. At this juncture, there is not enough heat in the exhaust manifold to vaporize the water. It is perhaps advantageous to vent the exhaust gases out through the tail pipe in the customary or traditional manner at this point. This also assists in bringing the tail pipe up in temperature to prevent rusting because of condensation in the tail pipe. The engine is allowed to achieve an optimum operating temperature. This is customarily obtained through the use of a thermostat in the cooling system which quickly brings the engine to a quiescent operating condition. All the while, this operating condition is achieved while elevating the temperature of the exhaust manifold rather rapidly. Water is injected into the double walled exhaust manifold to begin vaporization. Slight amounts of water are first introduced, and as the water is brought to a boil, pressure within the water chamber increases. It is for this reason that the valve 38 preferably includes a check valve feature. The steam is formed and is injected through the conduit 48 and the valve 50 into the conduit 66. Steam is preferably injected at a point relatively close to the carberator. There is no particular gain from injecting the steam at other points in the exhaust system.

As the exhaust manifold 12 reaches an elevated temperature and becomes somewhat stabilized, the thermostat 52 senses this and forms a signal on the conductor 54 which alters the position of the valve 58. This then redirects a certain portion of the gases from the conventional tail pipe through the conduit or pipe 60.

At this juncture, the device of the present invention begins to operate, recirculating some of the gases. The degree of opening may vary dependent on a number of factors such as the initial tuned condition of the engine, its degree of efficiency, its operating speed, and many other factors. But in any case, the valve 58 is so positioned to divert some of the exhaust flow, an increasing amount generally, to be recycled through the engine. As more exhaust gases are recirculated, the engine begins to burn cleaner and cleaner. Assume for sake of discussion that ten percent of the fuel is not properly combusted and passes in the form of uncombusted, but vaporized, hydrocarbon gases, out through the exhaust. The device of the present invention will recycle this portion, enhancing the combustion by the injection of the water and oxygen. Thus, the recycled gases, being somewhat depleted of oxygen in the beginning, tend to cause the engine to run less efficiently when being recycled. However, the injection of the elemental oxygen, only in slight amounts, and the further injection of water to change the operating temperature of the engine actually within the cylinders at the point of burning, sufficiently overcomes the loss in efficiency which would normally be expected with recycled exhaust gases. Therefore, the engine runs at an optimum proficiency and to the extent that gases are recirculated, the exhaust stream is made cleaner. The optimum result is, of course, an exhaust stream which includes the inert gases drawn in from the atmosphere and which are not consumed, as well as the consumed hydrocarbon waste products which are typically water and carbon dioxide.

The foregoing is directed to the preferred embodiment of the present invention. Many details may be altered or varied without departing from the scope of the present invention, which scope is determined by the claims appended hereto.

What is claimed is:

1. A pollution control system adapted to be installed on an internal combustion engine which internal combustion engine incorporates an exhaust manifold and a carberator, and comprising:
   a. a conduit means;
   b. valve means connecting said conduit means with the exhaust manifold of an internal combustion engine for deriving a portion thereof controllably determined by said valve means of the exhaust gases from said engine;
   c. said conduit means being connected at its other end to supply exhaust gases to the carberator of such an engine to be drawn therein along with air from the atmosphere and to be mixed with fuel in the customary functioning of the carberator;
   d. a container means adapted to receive a supply of water therein;
   e. a heat exchanger made integral with and deriving heat from the exhaust manifold of such engine and connected with said container means for receiving water therefrom;
   f. second conduit means communicating water vapor from said heat exchanger to the carberator for adding water vapor to the gases drawn in by the carberator of such an engine; and,
   g. means for controllably injecting elemental oxygen into the carberator.

2. The invention of claim 1 wherein said container means includes a conduit connected through a check valve means to said heat exchanger means, and a second conduit communicating from said heat exchanger means to the carberator.

3. The invention of claim 1 including cooperative with said engine:
   a. an exhaust pipe;
   b. muffler;
   c. tail pipe; and wherein said invention incorporates
   d. valve means in said tail pipe;
   e. valve operator for said valve means;
   f. thermostat connected to said engine for determining the operating temperatures therein; and,
   g. means for connecting said thermostat with said valve operator means.

4. The invention of claim 1 further including a mixing tee interposed between the carberator and an air cleaner and having an entry port for connection with said conduit means.

5. The invention of claim 4 further including an entry port for connection with the air cleaner and having therein a flap valve preventing backfires and the like from escaping into the air cleaner.

6. The invention of claim 5 further including an outlet port having a flap valve therein opening out from said mixing tee and further including spring bias means tending to close said flap valve.

7. The invention of claim 6 further including a conduit for supplying elemental oxygen into the carberator.

8. The invention of claim 1 including:
   a. a venturi incorporated in said conduit means;
   b. a closed chamber surrounding said venturi; and,
   c. a suction line connected into said chamber and adapted to be connected at its other end to the crank case of the engine.

9. The invention of claim 8 further including an additional suction line adapted to be connected to the valve cover of the engine.

10. The invention of claim 9 wherein said venturi includes a nozzle of decreasing diameter and a spaced concentric lip thereabout and joined to an additional portion of said conduit means for providing a path of flow of the exhaust gases from the exhaust.

11. The invention of claim 10 wherein gases are drawn through the first and second suction lines into the venturi.

12. The invention of claim 11 including cooperative with said engine:
   a. an exhaust pipe;
   b. a muffler;
   c. tail pipe; and wherein said invention incorporates
   d. valve means in said tail pipe;
   e. valve operator for said valve means;
   f. thermostat connected to said engine for determining the operating temperatures therein; and,
   g. means for connecting said thermostat with said valve operator means.

13. The invention of claim 12 further including a mixing tee interposed between the carberator and an air cleaner and having an entry port for connection with said conduit means.

14. The invention of claim 12 further including a mixing tee interposed between the carberator and an air cleaner and having an entry port for connection with said conduit means; an entry port for connection with the air cleaner and having therein a flap valve preventing backfires and the like from escaping into the air cleaner; an outlet port having a flap valve therein opening out from said mixing tee and further including spring bias means tending to close said flap valve; and, a conduit for supplying elemental oxygen into the carberator.

* * * * *